Patented Jan. 26, 1937

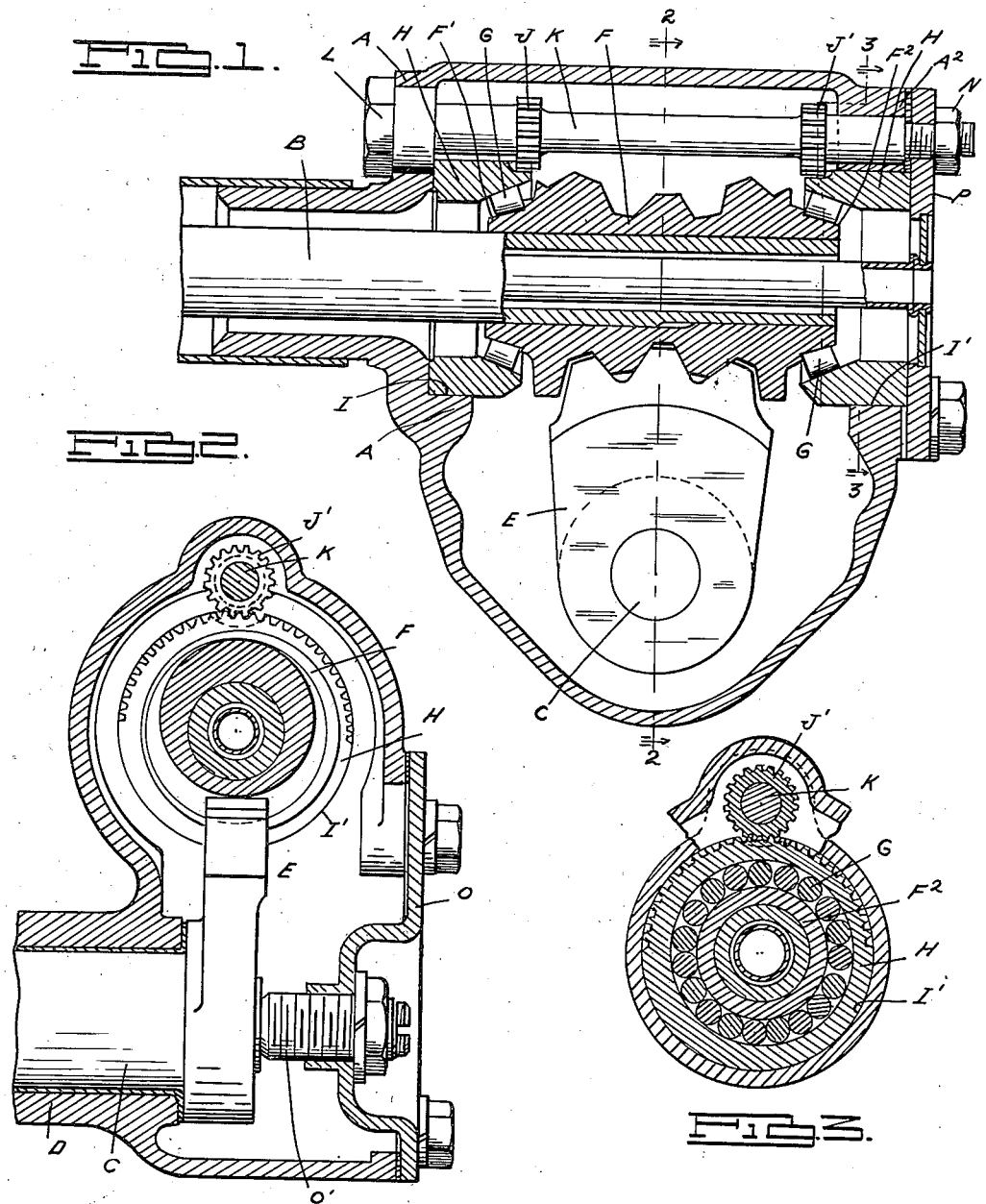

2,068,679

UNITED STATES PATENT OFFICE 2,068,679

WORM GEAR ADJUSTMENT FOR STEERING GEARS

Karl B. Hokansson, Detroit, Mich., assignor to Gemmer Manufacturing Company, Detroit, Mich., a corporation of Michigan Application March 25, 1935, Serial No. 12,950
Renewed April 25, 1936

3 Claims. (Cl. 74—500)

The invention relates to steering gears and has more particular reference to the means for adjusting the worm gearing which transmits movement from the steering stem to the rock shaft. The invention consists in the novel construction of such means as hereinafter set forth.

In the drawing:

Fig. 1 is a longitudinal section through the housing for the worm gearing;

Fig. 2 is a cross section on line 2—2, Fig. 1;

Fig. 3 is a cross section on line 3—3, Fig. 1.

As illustrated, A is the housing for enclosing a worm gearing through which movement is transmitted from the steering stem B to the rock shaft C, the latter being journaled in a bearing D which is integral with said housing. E is a worm gear segment mounted on the rock shaft C and F is a worm mounted on the stem B. This worm is provided at its opposite end with conical extensions F', F² which form the inner race members of roller bearings including the rolls G and outer annular race members H. The outer surface of each of the race members H is cylindrical with its axis eccentric to the axis of the inner surface which engages the rollers G. These race members are rotatable in cylindrical bearings I and I' formed within the housing A, the arrangement being such that a rotation of said race members H in their respective bearings will move the worm F towards or from the worm gear. To accomplish such adjustment a portion of the outer surface of the race members H have formed thereon gear segments adapted to mesh with gears J and J' on a shaft K arranged parallel to the stem B and journaled in the housing A at A' and A². The opposite ends of the shaft K pass out through the housing being provided at one end with a polygonal head L and the opposite end with a nut N for engaging a threaded portion of the shaft. Thus by turning the shaft K through its polygonal head L the eccentric race members H can be simultaneously adjusted rotatively, thereby moving the worm towards or from the worm gear. After such adjustment by tightening the nut N the parts will be clamped against accidental displacement.

The construction described forms an exceedingly simple means for taking up all lost motion in the worm gearing and without the necessity of disassembling any of the parts. It also permits of forming the gear housing integral with the bearing for the rock shaft C, as the axis of the latter remains always fixed in relation to the housing. The worm gear and rock shaft are introduced into the housing through an aperture in alignment therewith and which is closed by a cap O which is provided with a screw O' forming an end bearing against the center of the worm gear. A cap P closes the lower end of the housing through which the worm and roller bearings are introduced.

What I claim as my invention is:

1. In a steering gear, the combination with a worm and a worm gear, of a housing for enclosing the same, a rock shaft on which said worm gear is mounted, bearings for said rock shaft in fixed position in said housing, eccentric bearings for opposite ends of said worm rotatively engaging said housing, gear segments on the outer faces of said eccentric bearings, gears for engaging said gear segments, a shaft on which said gears are mounted and means operable from outside the housing for rotating said shaft.

2. In a steering gear, the combination with a worm and a worm gear, of a housing for enclosing the same, a rock shaft on which said worm gear is mounted, bearings for said rock shaft in fixed position in said housing, bearings for opposite ends of said worm including cones integral with the worm, rollers engaging said cones and annular race members engaging said rollers, said race members having eccentric inner and outer surfaces, bearings in said housing in which said race members are rotatively secured, gear segments on the outer faces of said race members, a shaft extending parallel to the axis of said worm having gear wheels thereon in engagement with said gear segments, said shaft extending through the walls of said housing and journaled therein, a polygonal head at one end of said shaft for rotating the same and a nut engaging a threaded portion in the opposite end of said shaft for locking the same to said housing to prevent accidental displacement.

3. In a steering gear, the combination with a worm and worm gear, of a housing for enclosing the same, a rock shaft on which said worm gear is mounted, bearings for said rock shaft holding the axis thereof in fixed position within said housing, cylindrical bearings within said housing at opposite ends of said worm, roller bearings in said cylindrical bearings and including cones integral with the worm at opposite ends thereof, rollers and roller race members, said race members having the axis of the inner surface thereof eccentric to the axis of the outer surface, a gear segment on the external surface of each race member, a shaft extending parallel to the axis of said worm shaft and having gear wheels thereon intermeshing with the gear segments on said race member, said shaft being journaled in said housing, and means operable from without the housing for turning said shaft to simultaneously and equally rotatively adjust said race members and to thereby move said worm towards or from said worm gear.

KARL B. HOKANSSON.